June 25, 1935.  R. W. CARSON  2,005,887

GRID GLOW MICROMETER

Filed June 5, 1931

WITNESSES:—
E. C. Leiding.
Hymen Diamond

INVENTOR
Robert W. Carson.
BY F. W. Lyle.
ATTORNEY

Patented June 25, 1935

2,005,887

UNITED STATES PATENT OFFICE 2,005,887

GRID GLOW MICROMETER

Robert W. Carson, Rochelle Park, N. J., assignor to Westinghouse Electric & Manufacturing Company, a corporation of Pennsylvania Application June 5, 1931, Serial No. 542,416

10 Claims. (Cl. 177—311)

My invention relates to indicating apparatus and has particular relation to measuring devices of the micrometer type.

For measuring small dimensions, the hand micrometer is ordinarily utilized, and, in general, it has given rather satisfactory results. The operation of the hand micrometer is well known and need not be described herein. The surface or the surfaces of the contact elements of the instrument are brought into contact with the surface or surfaces of the object to be measured, and when the force which the user has to exert to turn the micrometer screw-head by means of which the jaws are advanced, indicates engagement of both contact elements with the object measured, a reading is taken on the scale of the micrometer.

For very high accuracy, the simple hand micrometer has certain objectionable characteristics. Among them, the most important arises by reason of the fact that the surface of the contact-element penetrates the surface of the object to be measured to a degree which depends upon the sensitivity of the fingers of the operator of the instrument. When measurements are made, which it is desirable should have an accuracy of, say, $10^{-4}$ centimeters, the interpenetration of the jaws of the micrometer and the surfaces of the object to be measured becomes relatively considerable and the accuracy of the measusement is greatly impaired.

Another matter which seriously affects the usefulness of the ordinary micrometer resides in the fact that the contact-element in engaging the surface of the body to be measured may deform the body at the points of contact and leave a permanent imprint on the body. This difficulty is particularly annoying when plastic or very ductile materials, such as annealed copper, are to be measured. The defect also becomes rather serious in the measurement of highly specular or optic surfaces, such as the surfaces of the plates utilized in an interferometer or in an echelon-grating spectrometer.

It is, accordingly, an object of my invention to provide a micrometer of a type wherein the setting shall not be dependent on the human touch.

Another object of my invention is to provide a micrometer of the type wherein the personal error shall be eliminated in the setting operation.

A further object of my invention is to provide a micrometer wherein the setting shall be made without perceptible injury to the surfaces of the body to be measured.

An incidental object of my invention is to provide apparatus for indicating the coincidence of the surfaces of two bodies.

A further incidental object of my invention is to provide apparatus for indicating that the surfaces of two bodies are just on the verge of interpenetrating.

A still further incidental object of my invention is to provide apparatus for indicating that the surfaces of two independent bodies lie within the sphere of influence of each other.

More concisely stated, it is an object of my invention to provide a micrometer of a type wherein the measurement shall be made without any injurious effects on the body to be measured, and with so little aid from a human agency that the personal error introduced in the measurement shall be negligible.

In solving the problem with which I was confronted and in thus working out the objects of my invention, I made several unsuccessful attempts. In the first unsuccessful attempt, I set up a system of apparatus of a type which would probably first suggest itself to an experimenter working in the field in which I was engaged. The object to be measured and the contact element of the micrometer were connected to a lamp through a power supply source, such as a battery. When the contact element engaged the surface of the body to be measured, a lamp was lighted and an indication was given of the fact that the surfaces of the contact element and of the body to be measured were in contact with each other.

In carrying out this experiment, I encountered a number of difficulties. Since a lamp requires considerable current, a comparatively firm contact must be made between the surface of the body to be measured and the contact element. Although the contact thus required may not be as firm as the contact that may be made by the comparatively heavy hands of some operators, the effect of the contact on my experimental equipment was to mar the surface of the body to be measured in a number of instances.

Moreover, sparking ordinarily occurred between the contact element and the surface of the body to be measured. In consequence thereof, the surface was marred by the heat of the spark. Moreover since the metal was oxidized by the spark, a firmer contact for the setting operation became necessary.

The actual solution of my problem and accomplishment of the objects of my invention resulted from the application of certain facts concerning electrical contacts that are little known.

It is a fact that while the current between two cold electrodes brought into firm contact with each other and connected through the poles of a battery obeys Ohm's law, a current also passes between two contacts which are juxtaposed to each other in such manner that the superficial layers of electrons interpenetrate, which does not obey Ohm's law, but is given by the equation $$i = aCV^2 + bV$$

wherein $i$ represents the current, $V$ represents the potential impressed between the electrodes and $a$ $C$ and $b$ are constants depending on the characteristics of the electrodes. These non-ohmic currents probably arise by reason of the condensation of electrons from one body on the other and are consequently extremely minute. For potentials of ordinary magnitudes impressed between the electrodes, the currents are of the order of one microampere or less. The difficulties of sparking and of firm contact are entirely eliminated if these non-ohmic instead of ohmic currents are utilized in the detection of the coincidence of bodies.

It will be noted that in thus solving the problem with which I was confronted, it becomes necessary that I contemplate the surface of the object to be measured from a molecular standpoint. Hence, the matter of defining just where the surface of a body terminates became rather a puzzling question. However, if I define the bounding surface of the body as the plane passing through the centers of the outermost molecules thereof, I can say that, in general, the superficial electron vapor of a body will be within the region of the sphere of action of these molecules. That is to say, the density of the free electron vapor in the region of the body is substantial for a distance of the order of $10^{-8}$ centimeters (i. e., a distance approaching 4 or $5 \times 10^{-8}$ centimeters) from the actual centers of the molecules of the body. On the other hand, since micrometer measurements are only made in cases where an utmost sensitivity of $10^{-5}$ centimeters is required, the variations which may arise in the distance between two bodies, the electron vapors of which are interpenetrating, is comparatively minute. In the present document the word "coincident" will be utilized in defining the geometric condition of the surfaces of two bodies that are not in physical contact but the electron vapors of which are just on the verge of interpenetrating in such manner that a non-ohmic current passes therebetween.

With the realization of the complete significance of this development, my problem reduced itself to devising a method for detecting the non-ohmic current that passes between two bodies when their electron vapors are interpenetrating. I have found that by incorporating a grid controlled electric-discharge device in the system, the pressure of the minute non-ohmic currents may be detected.

In accordance with my invention, therefore, I have combined a grid control electric discharge device of suitable characteristics with an ordinary micrometer. In the preferred embodiment of my invention described herein, the control electrode of the electric discharge device is connected to the object to be measured, (if it is a conducting body,) and a principal electrode of the electric discharge device is connected to the contact element of the micrometer.

Under normal circumstances, the electrostatic potential of the electrode is such that a current through the electric discharge device does not flow. It is a well-known fact that by suitably adjusting the potential of the control electrode of the electric discharge device current flow may be blocked. When the contact element of the micrometer and the surface of the body to be measured are so near to each other that the electron vapors of the two bodies interpenetrate the electrostatic condition of the control electrode is changed by reason of the flow of the non-ohmic current, and a luminous discharge passes between the principal electrodes of the discharge device.

If the body to be measured is a non-conductor, such as glass for example, the body is disposed on a platform and a light metallic plate preferably having a contact surface of optic characteristics is disposed on the body. The electric discharge device is connected to the metallic plate, and the contact element of the micrometer head is juxtaposed thereto. The non-ohmic current flowing between the light plate and the contact element tends to change the condition of the control electrode of the electric discharge device and to produce a luminous discharge in the device.

It is to be noted that to produce the most satisfactory results, I have found that the edge of the contact element should be comparatively sharp by reason of the fact that capacity effects may introduce spurious results. However, I have found that if the element is made to have a radius of approximately .001 inch, satisfactory results are attained.

The effect of capacity may of course also be eliminated by adding elements (e. g., neutralizing devices) to the apparatus. So that the scope of my invention shall not be limited to apparatus in which the capacity effect is eliminated only by making the radius of the contact element small, I shall hereinafter refer to contrivances for eliminating the capacity effect by using the phrase "means contrived to eliminate the effect of capacity." The word "means" as so used is intended to apply to a structural feature in an element of the apparatus, such as the contact element here for example, as well as to a concrete addition to the apparatus.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which:

Figure 1:
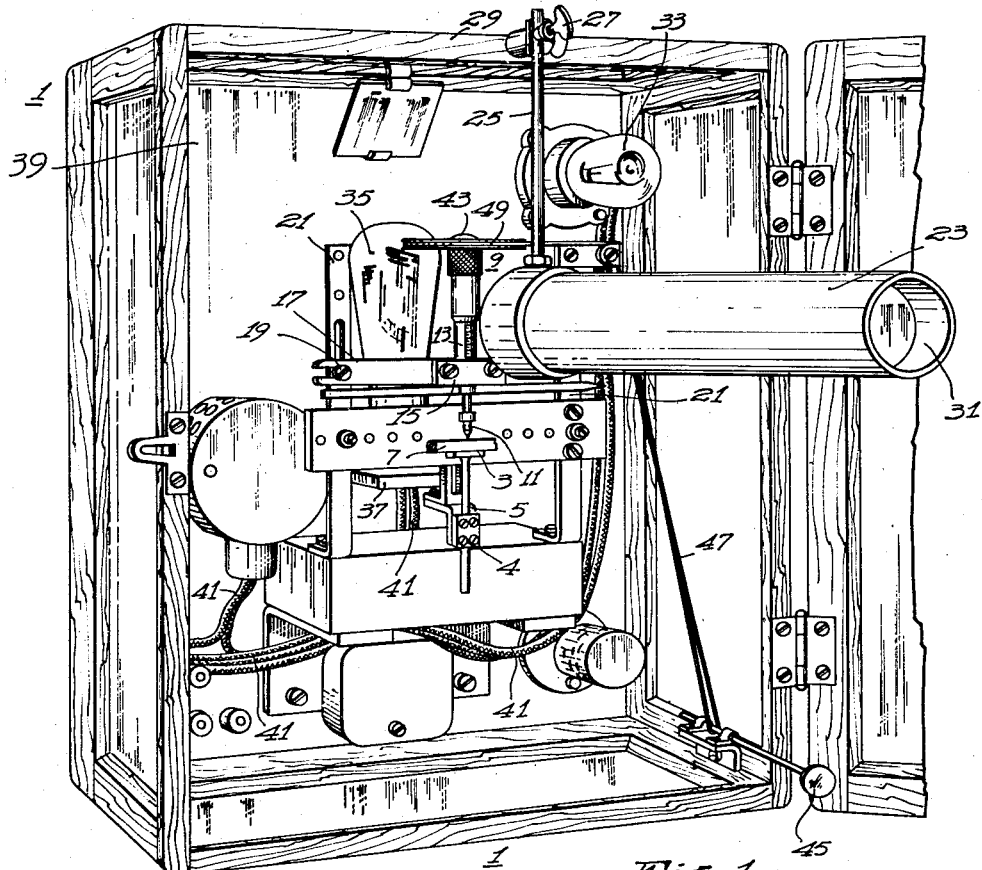
Figure 1 is a view in perspective showing a preferred embodiment of my invention.

The apparatus shown in Fig. 1, comprises a container 1 having disposed therein a platform 3, suitably supported at a predetermined height, from an insulating block 4 secured to a bracket 5 whereon the object 7 to be measured is disposed. A mechanical micrometer 9 comprising a contact element 11 and a scale 13 is rigidly secured to a block 15, which is, in turn, affixed to a horizontal bar 17, slidably supported from a plurality of pins 19 that project into a plurality of vertical bars 21.

A telescope 23 is affixed to a bar 25 supported by a clamp 27 from the upper rim 29 of the container 1, wherein the instrument is disposed, and is so arranged relative to the scale 13 of the micrometer 9 that the scale may be observed in magnified condition through its eye piece 31. A lamp 33 is provided within the container 1 for illuminating the scale 13 of the micrometer 9.

An electric discharge device 35 is disposed on a suitable bracket 37 secured to the rear wall 39 of the container 1, and a plurality of leads 41 are provided for electrically connecting the lamp 33 to a source of power (not shown) and the electric discharge device 35 to the source of power and to the necessary elements of the measuring system.

The screw-head 43 of the micrometer 9 is rotated from a screw 45 through a belt 47 which engages a pulley 49 secured to the screw-head 43. The contact element 11 of the micrometer 9 is advanced by the rotation of the screw-head and the differences in the readings taken when the tube 35 glows with the contact element juxtaposed to the bare platform 3 and with the contact element juxtaposed to the surface of the test plate 7, disposed on the platform 3, is equal to the thickness of the plate 7.

It is to be noted that while a micrometer with a single contact element is shown as utilized in the preferred embodiment of my invention, I do not intend to be restricted by such an element, and systems wherein micrometers with double contact elements are utilized are equivalents which lie within the scope of my invention.

Figure 2:
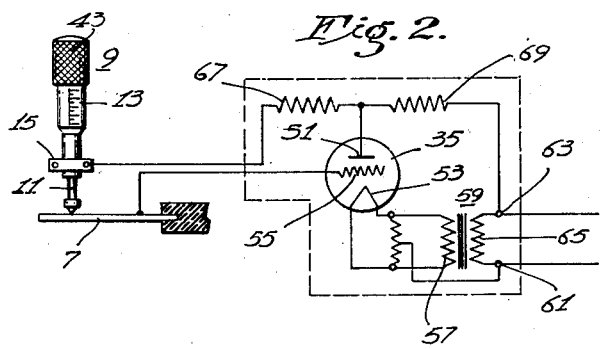
Fig. 2 is a diagrammatic view showing a circuit utilized in the practice of the preferred embodiment of my invention.

In Fig. 2 the circuit provided for the system is illustrated. As shown in the view, the electric discharge device 35 utilized in the practice of my invention is preferably a grid control glow tube having a plurality of principal electrodes 51 and 53 and a control electrode 55. Although a cold electrode electric discharge device may be utilized in the practice of my invention, I have preferred to incorporate a hot cathode device in the system, which I commonly use, for the reason that the luminous discharge produced by the hot cathode electric discharge device is more intense than the discharge produced by the cold cathode device.

The cathode 53 of the electric discharge device 35 is heated from the secondary 57 of transformer 59. The terminals 61 and 63 of the primary 65 of the transformer 59 are connected to the cathode 53 and the anode 51 of the electric discharge device. The control electrode 55 of the device 35 is conductively connected to the object 7 to measured, and the anode 51 of the electric discharge device 35 is connected to the contact element 11 of the micrometer 9 through a suitable impedance 67. A current-limiting impedance 69 is also provided in the principal circuit of the electric discharge device 35.

It is to be noted that while circuits of the type described herein are highly satisfactory, I have found that I can improve the operation of the system by including a suitable impedance between the control electrode 55 and the cathode 53 of the electric discharge device 35. Such an arrangement is more stable than a system which incorporates a floating grid feature as is the case with the embodiment described herein.

For purposes of clarity the control electrode 55 has been shown as connected to the test plate 7. In actual practice the control-electrode is connected to the platform 3 wherein the test plate 7 is supported. It is for this reason that the platform 3 is supported from an insulating block 4 as shown in Fig. 1.

I have preferred to utilize a gaseous electric discharge device in the ordinary application of my invention, although a vacuum device might be utilized under certain circumstances. The potential that is impressed between the principal electrodes 51 and 53 of the electric discharge device 35 by the transformer 65 is such that the device is normally deenergized when the control electrode 55 is not inductively coupled to the anode 51 through the micrometer head 11. When the control electrode 55 is free electrically as it is in the system shown in Fig. 2, it gathers a negative charge from the cathode 53 and for proper potentials impressed between the anode 51 and the cathode 53 prevents the electric discharge device 35 from becoming energized. However, when the contact element 11 of the micrometer 9 comes within the sphere of influence of the molecules of the body 7 to be measured, the potential between the anode 51 and the control electrode 55 of the tube 35 is materially decreased since the negative charge is removed from the control electrode 55 and a luminous discharge is produced in the tube.

Broadly speaking, the current which is transmitted between the anode 51 and the cathode 53, whether it be substantially zero current or a large current, may be designated as a "predetermined current".

The amount of electricity which must pass across the contact between the micrometer and the test specimen to cause a discharge between the main electrodes of the tube 35 is almost inconceivably minute; hence the device is responsive to an inconceivably delicate contiguity with the specimen, and the latter is protected from the slightest injury arising from mechanical or electrical forces.

The discharge is indicative of the coincidence of the surfaces of the contact element 11 of the micrometer 9 and of the body 7 to be measured. The screw-head 43 may be locked in position when such a condition occurs, and the indication of the scale may be read through the telescope.

In ways obvious to those skilled in the art the discharge itself may be used to actuate the locking device or to record the position of the micrometer head at the instant it occurs.

Figure 3:
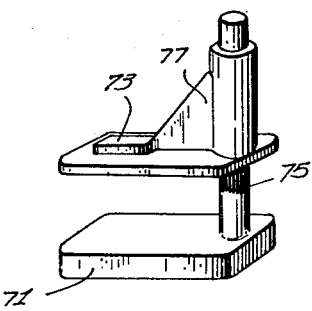
Fig. 3 is a view in perspective showing the essential elements utilized in the practice of my invention when it is applied to the measurement of insulating bodies.

In Fig. 3, I have illustrated the necessary elements of a device which would be utilized in the practice of my invention in measuring insulating bodies.

The apparatus comprises simply a platform 71 on which the body to be measured (not shown) is disposed and a plate 73 slidably supported from a rigid bar 75 projecting from the platform 71. The surfaces of engagement of the bar 75 and the plate support 77 are made comparatively long, and in consequence thereof, the plate 73 is maintained in a position substantially parallel to the surface of the platform 71 on which the insulating body is to be supported.

The operation of such a system is apparent from the description which has been given hereinabove, and for purposes of brevity and clarity, the structural details of the system have not been shown. The contact element 11 of the micrometer 9 is simply brought into coincidence with the surface of the plate 73 disposed on the object to be measured, and the scale 13 of the micrometer 9 is read when the glow tube indicates that the surface of the contact element 11 and the surface of the plate 73 are within the sphere of influence of each other. It is needless to say that in practicing my invention, as set forth above, the plate 73 to be disposed on the dielectric should be comparatively light and suitable insulation should be provided to prevent an ohmic electrical contact between the elements of the contact element 11 and the plate 71.

As has been indicated hereinabove, a gaseous discharge device of the hot cathode type is ordinarily utilized in the practice of my invention. It should be kept in mind that I do not wish to limit myself to such a device. I might, for example, utilize a mercury vapor discharge device and also a vacuum discharge device. A vacuum device does not emit a visible glow when a current is flowing between its electrodes, consequently in applying such a discharge device to my invention, a lamp, and a relay, responsive to the current through the vacuum device, to close the circuit of the lamp must be incorporated in the system. The lighting up of the lamp will, in such a system, indicate the contiguity of the two bodies which are under consideration.

Finally I may say that I do not wish to be restricted by the theoretical explanation which has been given hereinabove of the operation of my invention. While the electron theory is widely accepted, it is after all only a theory and may fall when new facts are discovered. It will be noted that while the electron theory has guided me in my work the result of the work is of purely experimental nature and as experimental work it stands on its own feet regardless of theory.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A micrometer comprising a contact element to be juxtaposed to the surface of an object to be measured, said contact element being of such structure that the electro-static capacity between said contact element and said surface is substantially negligible, means for indicating the position of said contact element, means for causing non-ohmic currents to flow between said contact and said object when a plane through the outermost region of said contact element is at distance of the order of $10^{-8}$ centimeters from a plane through the outermost region of the object to be measured and indicator means responsive to said non-ohmic currents.

2. In combination a contact element to be juxtaposed to an object to be measured, means, operative when the surfaces of said contact element and said object are just on the verge of being in physical contact with each other, to cause a discharge so minute as to be invisible to traverse the space between said surfaces and means to respond to said discharge to indicate that said discharge is passing, the apparatus including means contrived to eliminate the effect of capacity between said contact element and said object.

3. A micrometer comprising in combination a contact element to be juxtaposed to the surface of an object to be measured, means, operative when the surfaces of said object and said contact element are just on the verge of being in physical contact with each other, to cause non-ohmic currents to traverse the space between the surfaces of said body and said contact element and means responsive to said non-ohmic currents for producing a readily perceptible indication of the flow of said non-ohmic currents, the apparatus including means contrived to eliminate the effect of capacity between said contact element and said object.

4. A micrometer comprising in combination a contact element to be juxtaposed to a surface to be measured, means, operative when the surfaces of said element and said object are just on the verge of being in physical contact with each other, to cause a minute current to traverse the space between said surface and the surface of said contact element and means to respond to said minute current for producing a readily perceptible indication of the flow of said minute current, the apparatus including means contrived to eliminate the effect of capacity between said contact element and said object.

5. A micrometer comprising in combination a contact element to be juxtaposed to a surface to be measured, means operative when the surfaces of said contact element and said object are just on the verge of being in physical contact with each other to cause a minute current to traverse the space between said surface and the surface of said contact element, and means for both producing a large current in response to the flow of said minute current and producing a substantial indication that said minute current is flowing, the apparatus including means contrived to eliminate the effect of capacity between said contact element and said object.

6. A micrometer comprising a contact element to be juxtaposed to an object to be measured, an electric discharge device having a control electrode and a plurality of principal electrodes, means for impressing a potential between said principal electrodes, means for impressing a potential between said control electrode and one of said principal electrodes to maintain a predetermined current between said principal electrodes, means to cooperate with said means for impressing a potential between said control electrode and said principal electrode and with said contact element to cause a discharge so minute as to be invisible to traverse the space between the surface of said object to be measured and the surface of said contact element when said surfaces are just on the verge of being in physical contact with each other and means for impressing the current output of said discharge on said control electrode thereby to vary the potential impressed between said control electrode and said principal electrode and the current between said principal electrodes, to indicate that said discharge is passing, the apparatus including means contrived to eliminate the effect of capacity between said contact element and said object.

7. A micrometer comprising a contact element to be juxtaposed to an object to be measured, an electric discharge device having a control electrode and a plurality of principal electrodes immersed in a gaseous medium, means for impressing a potential between said principal electrodes, means for impressing a potential between said control electrode and one of said principal electrodes to normally maintain said device in deenergized condition, means to cooperate with said means for impressing a potential between said control electrode and said principal electrode and with said contact element to cause a current of the order of one microampere to traverse the space between the surface of said contact element and the surface of the object to be measured when said surfaces are just on the verge of being in physical contact with each other and means for impressing said current on the control electrode of said electric discharge device thereby to vary the potential impressed between said control electrode and said principal electrode to energize said device to emit a luminous glow, and indicate that said current of the order of one microampere is being transmitted between said surfaces, the apparatus including means contrived to eliminate the effect of capacity between said contact element and said object.

8. The method of measuring the extent of an object in a predetermined direction with apparatus of the type incorporating an electric discharge device having a control electrode and a plurality of principal electrodes and a contact element to be juxtaposed to said object which, the apparatus including means contrived to eliminate the effect of capacity between said contact and said object comprises the steps of impressing potentials between the electrodes of said device such that said device is normally deenergized, impressing a potential between said contact element and said object to be measured such that only a minute current can under any circumstances traverse the space between the surfaces of said object and said contact element, bringing the surfaces of said contact element to such a position that it is on the verge of physical contact with the surface of the object to be measured thereby to cause a minute current to traverse the space between said surfaces, impressing said minute current between the control electrode and a principal electrode of said electric discharge device thereby to energize said device and noting the position of said contact element when said device is so energized.

9. A micrometer comprising in combination a contact element having a contact surface that is of the order of .001 inch in radius to be juxtaposed to a surface to be measured, said element being otherwise of such structure that the capacity between it and said surface to be measured is negligible, means, operative when the said surface and the surface of said contact element are just on the verge of being in physical contact with each other, to cause a minute current to flow between said surface and the surface of said contact element and means to respond to said current to indicate the coincidence of said surfaces.

10. A micrometer comprising in combination a contact element having a contact surface that is of the order of .000003 square inch in area to be juxtaposed to a surface to be measured, said element being otherwise of such structure that the capacity between it and said surface to be measured is negligible, means, operative when the said surface and the surface of said contact element are just on the verge of being in physical contact with each other, to cause a minute current to flow between said surface and the surface of said contact element and means to respond to said current to indicate the coincidence of said surfaces.

ROBERT W. CARSON.